United States Patent [19]

Gluntz

[11] Patent Number: 4,830,815
[45] Date of Patent: May 16, 1989

[54] ISOLATION CONDENSER WITH SHUTDOWN COOLING SYSTEM HEAT EXCHANGER

[75] Inventor: Douglas M. Gluntz, San Jose, Calif.

[73] Assignee: General Electric Company, San Jose, Calif.

[21] Appl. No.: 185,739

[22] Filed: Apr. 25, 1988

[51] Int. Cl.[4] .............................................. G21C 15/18
[52] U.S. Cl. ...................................... 376/299; 376/298
[58] Field of Search ................................. 376/298, 299

[56] References Cited

U.S. PATENT DOCUMENTS 3,431,168  3/1969  Kjemtrup ............................ 376/298
4,689,194  8/1987  Wachholz et al. ................... 376/299

FOREIGN PATENT DOCUMENTS 1231492  10/1986  Japan ................................ 376/298

Primary Examiner—Deborah L. Kyle
Assistant Examiner—Richard W. Wendtland
Attorney, Agent, or Firm—Robert R. Schroeder

[57] ABSTRACT

An improved decay heat removal system and apparatus for a nuclear boiling water reactor. The apparatus includes an isolation condenser shell, water coolant, and heat exchange surfaces that are immersed in the water coolant and are sized for shutdown cooling duty. The apparatus is time shared for both isolation cooling and shutdown cooling duty. The invention reduces the total number of heat exchange surfaces and heat exchanger shells required for dissipating heat generated by the reactor core as compared to conventional, separate isolation cooling and shutdown cooling systems. In addition, the amount of reactor building space which must be reserved for isolation cooling and shutdown cooling requirements may be significantly reduced.

5 Claims, 3 Drawing Sheets

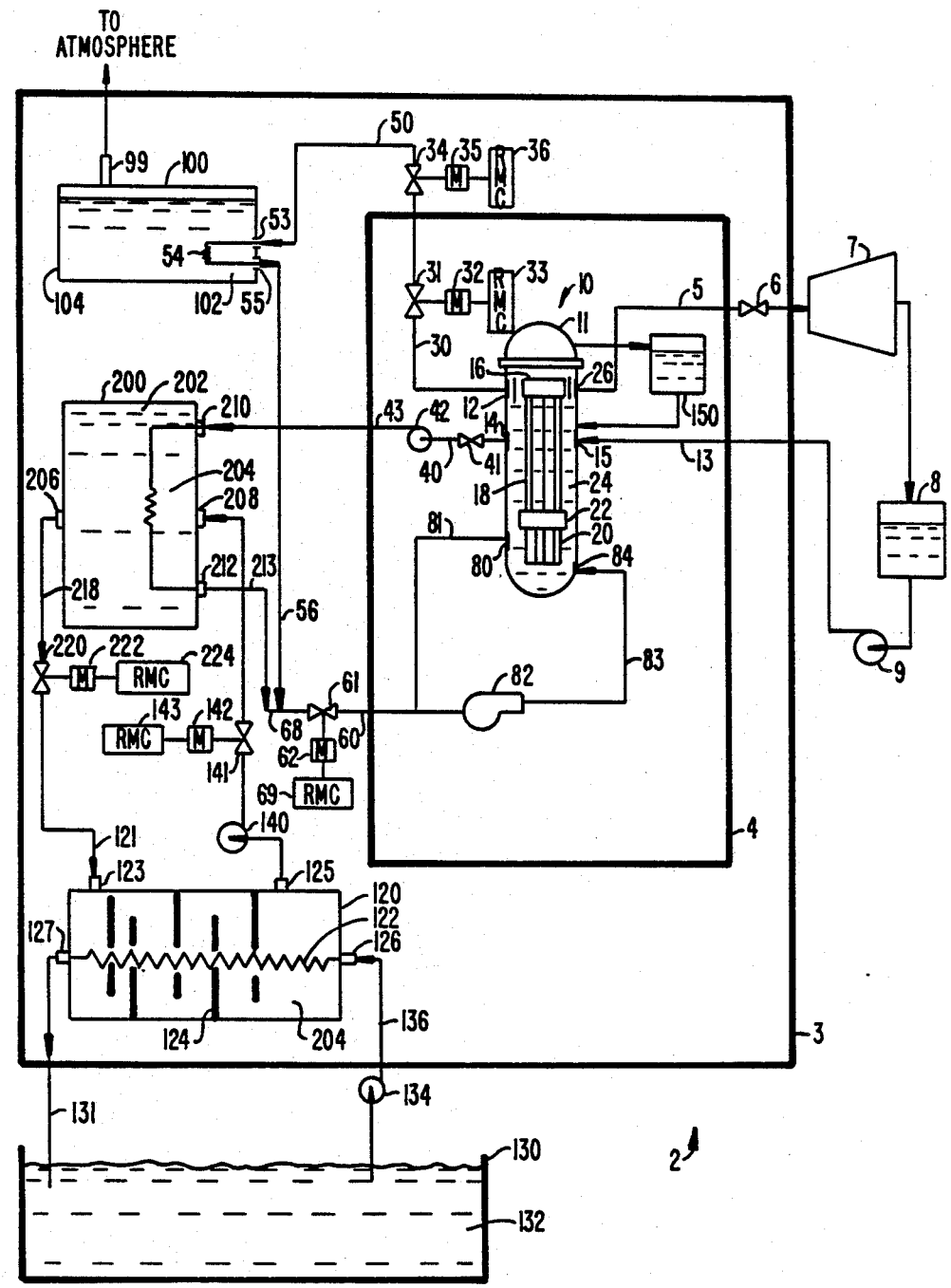
FIG.—1. PRIOR ART

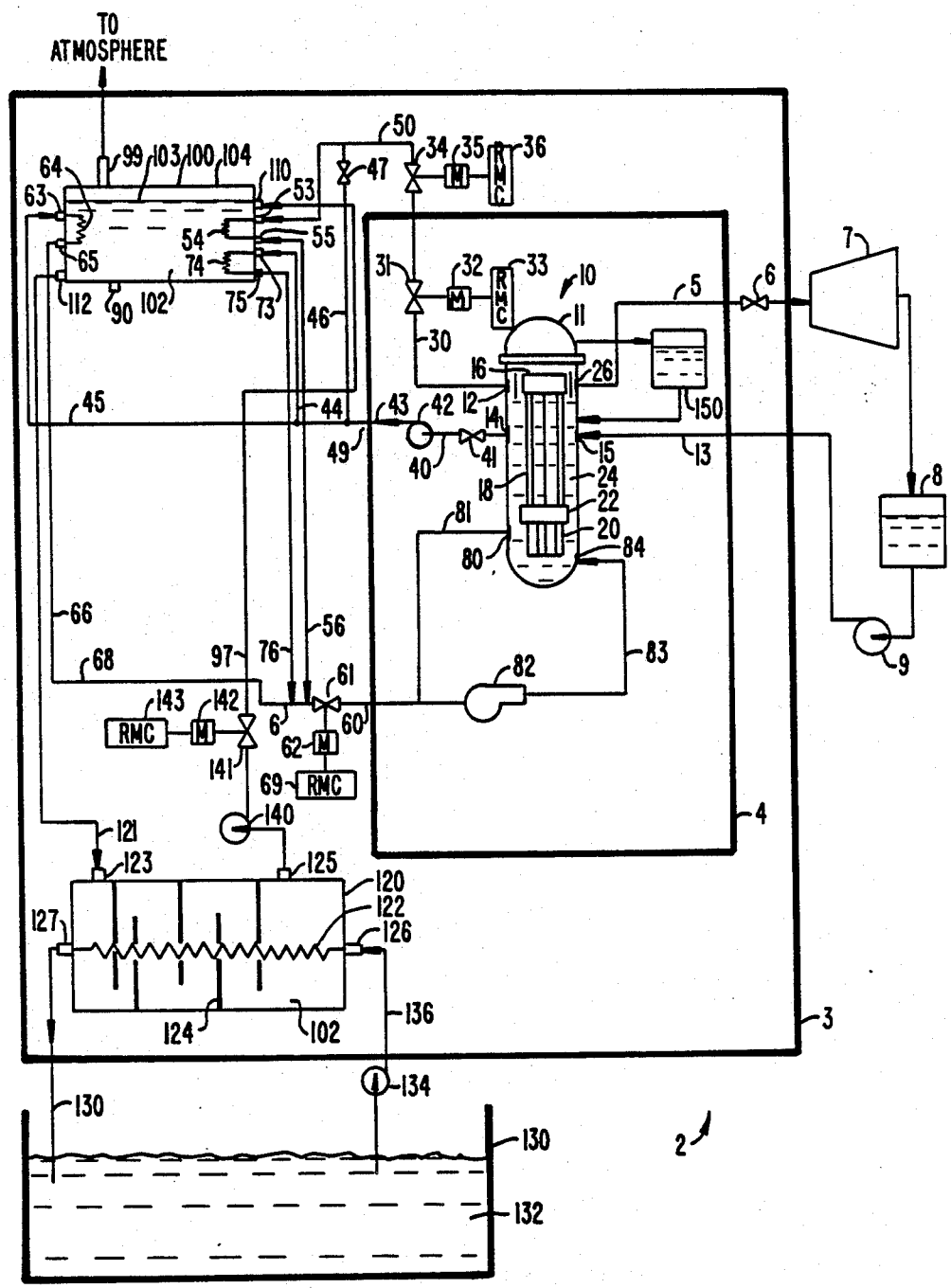
FIG._2.

U.S. Patent May 16, 1989 Sheet 3 of 3 4,830,815
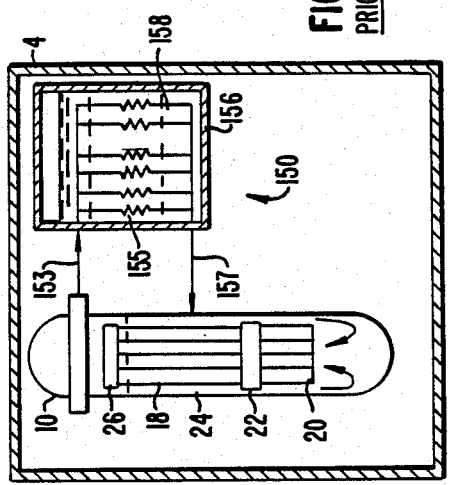
FIG._3.
PRIOR ART
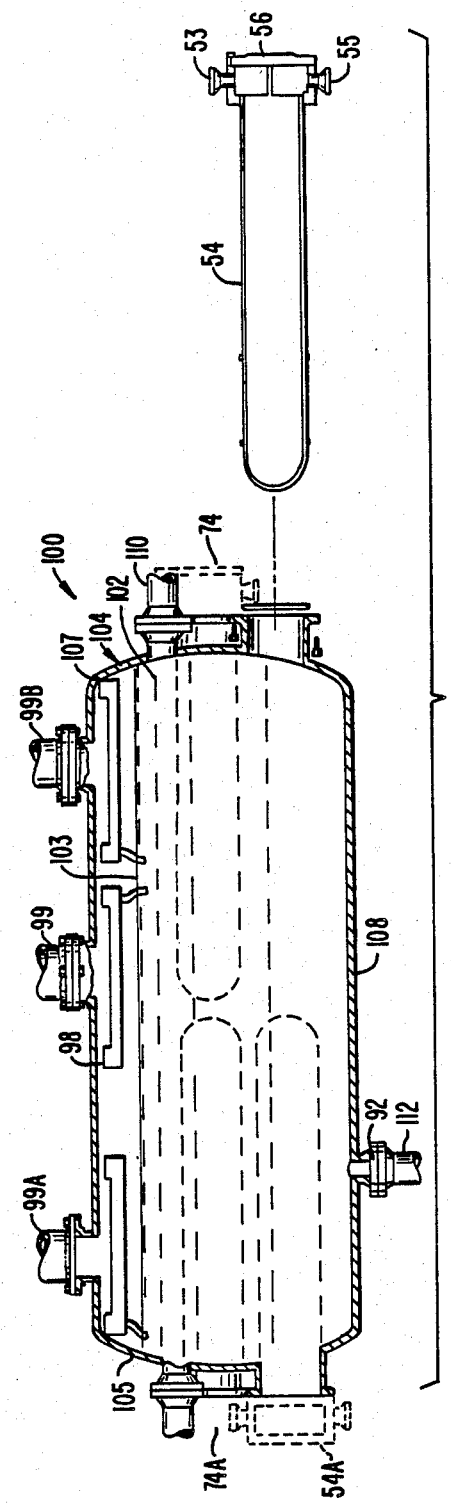
FIG._4.

ISOLATION CONDENSER WITH SHUTDOWN COOLING SYSTEM HEAT EXCHANGER

The present invention relates to an improved decay heat removal system for a nuclear boiling water reactor. More particularly, the invention relates to a modified condenser that provides both isolation cooling and shutdown cooling for a boiling water nuclear reactor.

BACKGROUND OF THE INVENTION

Many electric power generating stations utilize nuclear boiling water reactors. In these stations. a reactor core heats water to generate a two-phase steam/water mixture. The steam/water mixture is conveyed to a steam separator assembly underlying a steam dome in the reactor. The steam separator assembly classifies the steam from water in the two-phase mixture.

The steam is provided to a turbine-generator which produces electric power. Electric power is transferred from the turbine-generator to an electric power grid, and from the grid is distributed to the entire utility system.

The spent steam from the turbine-generator is generally ducted to a condenser. The condenser converts the spent steam into condensate. A feedwater injection system returns the condensate to the nuclear boiling water reactor as feedwater and as reactor coolant. In many nuclear boiling water reactors, the water which is separated from the steam/water mixture by the steam separator assembly provides the remainder of the reactor coolant. The reactor coolant inventory initially within the reactor, or resupplied to the reactor under various episodes, provides heat removal from the fuel rods which thus maintains the fuel cladding material at acceptable temperatures at all times.

Various events, such as a fault on the utility transmission lines, can cause the power station to become isolated from the main power grid. When the station becomes isolated, the turbine-generator no longer drives a load.

Many power generating plants employ steam stop valves to prevent steam from reaching the turbine when the turbine-generator becomes electrically isolated. These stop valves are coupled between the reactor and the turbine-generator and will rapidly close when the turbine-generator is isolated from the load.

Simultaneously with closure of the steam stop valves, station control procedures will trigger a reactor SCRAM. The reactor SCRAM scenario causes control rods to be inserted into the fuel assemblies to produce a subcritical core and, thus, to terminate the nuclear fission process. Total shutdown of the nuclear reactor occurs within a few seconds.

Notwithstanding that the reactor is shutdown following such a transient, a problem arises in that large quantities of steam were generated in the few seconds between stop valve closure and core fission cessation. This generated steam becomes added to the normal steam inventory, present both in the reactor steam dome and in the main steam lines connecting the reactor vessel to the turbine-generator, causing a further increase in steam pressure.

In addition, even though the reactor is shutdown, heat is continuously generated because of the radioactive decay of fission by-products in the fuel rods. This continuous addition of heat to the water in the reactor causes steam to be continuously generated and further increases the pressure within the isolated reactor vessel. This problem of continued decay heat generation is present not only immediately following isolation of the reactor from the turbine generator, but also throughout long time periods following shutdown of the nuclear reactor.

Various isolation cooling systems have been employed for dealing with this excess steam. Some stations are provided with bypass systems which use fast acting valves to shunt the steam from the reactor to a main condenser. These systems require substantial extra condenser heat removal capacity, bypass valves, and pipelines, which all together are very expensive.

Since, on occasion, steam from the reactor may be radioactive, it is necessary to avoid venting the reactor primary steam directly to the power station environment. Thus direct venting of reactor primary steam to the atmosphere is not a feasible alternative for an isolation cooling system.

Some isolation cooling systems relieve the excess steam intermittently through steam relief valves installed on a multiplicity of pipelines coupling the reactor to underwater discharge points within a large pool of water. One such commonly used arrangement employs the suppression pool located within the containment building of nuclear boiling water reactor power stations as the receiver pool for these steam discharges. These isolation cooling systems utilize various types of coolant makeup systems to replenish the reactor coolant lost by venting. These systems are expensive, however, because of the size and multiplicity of the relief valve discharge lines, their penetrations through containment structures, their end-termination steam quenchers, and the coolant makeup systems that provide coolant replenishment.

Still other isolation cooling systems shunt the excess steam to one or more isolation condensers during a reactor isolation condition. The isolation condenser is typically configured as a large elongated cylindrical tank. The isolation condenser is usually located at an elevation higher than the reactor steam dome, such as on an upper floor within the reactor building.

The supply side of the isolation condenser is typically connected by pipes to the reactor steam dome. A piping network returns cooled, condensed steam back to the reactor as coolant.

The isolation condenser requires a large initial coolant inventory for cooling the hot reactor steam, and heat exchange surfaces through which the steam flows. To minimize the need for cleaning the exchange surfaces, demineralized water is normally used as the water coolant in the isolation condenser.

Upon the occurrence of an isolation transient, steam is shunted from the reactor steam dome to the supply side of the isolation condenser. The hot steam, typically around 545° F., transfers its heat through the heat exchange surfaces to the surrounding water coolant. During such isolation cooling, heat transfer rates are sufficiently high to boil the water coolant. The steam generated by boiling may be safely ducted to the outside atmosphere since the demineralized water is nonradioactive.

Conventional power stations have employed an additional long term heat removal system called a "shutdown cooling system" to reduce the temperature in the reactor down to around 125° F. Conventional shutdown cooling systems usually rely on dedicated heat exchangers and a separate piping and valving network distinct from the isolation cooling system. Generally, these systems circulate hot reactor coolant through the shell side of the shutdown cooling heat exchanger and circulate cooler intermediate coolant through the tube side of the heat exchangers; however, a number of design alternatives are available depending on the specific application and power station.

Unfortunately, conventional shutdown cooling systems are capital intensive, and therefore costly, in several notable respects.

First, these systems require separate piping, valving, control, and heat transfer equipment above that required for isolation cooling, and therefore represent a significant plant capital cost.

In addition, these systems are large. The heat transfer challenge for these systems is relatively great because of the small temperature differential between the target tmperature, i.e., 125° F., and the temperature of available coolant. i.e., 95° F. To compensate for this low temperature differential, shutdown heat exchangers must use substantial amounts of heat transfer surface area and coolant. For example, medium power rated boiling water reactors having access to 80° F. coolant, require a heat exchanger 5 feet in diameter and 30 feet in length. Larger power rated reactors using warmer coolant employ heat exchangers up to 6 or 7 feet in diameter with dual shells which are each up to 40 to 50 feet in length.

Shutdown heat exchangers are therefore large and costly. In addition, these heat exchangers are normally housed in the reactor building and require a long tube pull space to facilitate maintenance. Thus, the size of the heat exchangers can often be a controlling parameter, significantly influencing the physical design of the reactor building.

Another problem is created if the coolant in the heat exchanger is not demineralized water. If not demineralized, then the coolant often generates deposits or fouling conditions which increase maintenance problems. On the other hand, the reactor coolant is clean. Since it is more difficult to clean the outside surface of the heat-exchanger tubes than their insides, it is desirable that coolant from the reactor be piped to the shell side of the heat exchangers to minimize the frequency of external cleaning and maintenance. Since the reactor coolant is highly pressurized, this requires that the heat exchanger shell carry a design rating up to several hundred psig. As a result, the heat exchanger must have relatively thick walls or some other expensive shell configuration.

Some shutdown cooling systems cool the reactor coolant using clean water circulated within a system known as a reactor closed cooling water system—often termed a "RCW system". The RCW water is in turn cooled at a buffer heat exchanger using ordinary (often dirty) secondary coolant—such as river water.

One benefit of this technique is that RCW water is normally demineralized and poses less maintenance problem than the dirty secondary water coolant. However, when two heat exchangers are used, the driving temperature differential for each is cut in half. Thus, the size of each heat exchanger must be approximately doubled to meet the shutdown heat exchange duty. Thus, power stations that use intermediate buffer heat exchangers for shutdown cooling require even larger and more expensive exchangers and reactor building space.

Recently designed nuclear boiling water reactors have begun to integrate some of the various required emergency cooling functions. For example, one known boiling water reactor seeks to combine the isolation condenser with a gravity-driven cooling system. This gravity-driven cooling system performs emergency core cooling for the nuclear reactor core during a loss-of-coolant accident (LOCA). The gravity-driven cooling system employs a suppression pool which is elevated relative to the reactor core and filled with a coolant inventory during normal operation of the reactor. Following a loss-of-coolant accident, the reactor pressure vessel is depressurized. When the pressure inside the reactor falls below the gravitational head of the elevated pool of coolant, the coolant flows into the reactor pressure vessel to cool the reactor core.

The heat exchange surfaces that are normally housed in the isolation condenser shell are located directly in the suppression pool in one known advanced reactor design. One advantage of this arrangement is that it eliminates the isolation condenser shell. However, this arrangement locates the heat exchange surfaces under water in the suppression pool. Not only is the suppression pool itself remote, but the underwater location creates additional maintenance problems for the heat exchange surfaces.

Further, the suppression pool coolant is not normally intended to be vented to atmosphere because its contents may be slightly radioactive. Thus, the suppression pool with its isolation condenser heat transfer surfaces must be designed to prevent undue level swell and boil-off of the suppression pool coolant when used to remove heat from the steam. In addition, the heat exchange surfaces must be arranged in sophisticated configurations to optimize the heat removal process.

SUMMARY OF THE INVENTION

It is intended that the invention provide a cost effective solution to the foregoing problems.

It is an object of the invention to minimize the size, number, and cost of the heat exchangers, valves, and associated pipes needed for shutdown cooling and isolation cooling for a boiling water nuclear reactor.

It is another object of the invention to minimize the maintenance required for isolation cooling and shutdown cooling systems.

Yet another object of the invention is to minimize the space required in the nuclear reactor building for housing shutdown cooling and isolation cooling equipment.

Still another object of the invention is to reduce the need for heat exchangers having high pressure shells during shutdown cooling.

According to the invention, a combined isolation cooling and shutdown cooling system is provided. The invention takes advantage of the fact that shutdown cooling and isolation cooling are not simultaneous cooling modes and thus can time-share a single cooling apparatus for both functions.

The cooling apparatus includes a housing containing isolation condenser water coolant and a plurality of heat exchange surfaces. The housing may be a conventional isolation condenser shell and may be vented to the atmosphere. The heat exchange surfaces are sized to meet the more demanding shutdown cooling requirements for the nuclear boiling water reactor.

During the isolation cooling mode, steam is circulated from the reactor to the apparatus for cooling. Condensed steam is returned to the reactor as makeup reactor coolant.

During the shutdown cooling mode, reactor coolant is circulated from the reactor to the apparatus for cooling. Cooled reactor coolant is returned to the reactor for additional cooling duty.

The isolation condenser water coolant is circulated from the apparatus to at least one secondary heat exchange system and back into the cooling apparatus to remove heat from the isolation condenser coolant during the shutdown cooling mode.

The isolation condenser water coolant in the apparatus has a free surface and is vented to atmosphere. The isolation condenser water coolant is allowed to boil away as steam during the isolation cooling mode, which reduces pressure requirements for the housing.

A common piping system may also be used to circulate the hot steam and the hot reactor coolant from the reactor to the apparatus and to circulate condensed steam and reactor coolant back to the reactor.

The invention reduces the total amount of heat transfer surface area required for separate isolation condensers and shutdown heat exchangers compared to that presently used in conventional systems. The invention also eliminates the need to separately house and maintain at least one shutdown cooling heat exchanger. The invention also permits a reduction in the total length of piping required because common piping is used for both the isolation and shutdown cooling modes.

Further objects and features of the invention will become apparent by reference to the following brief description of the drawings, the detailed description and the claims appended hereto.

BRIEF DESCRIPTION OF THE DRAWINGS

FIG. 1 is an illustration of a nuclear power generating system including separate isolation cooling and shutdown cooling systems according to the prior art.

FIG. 2 is an illustration of a nuclear power generating system including an improved cooling system according to one embodiment of the invention.

FIG. 3 is a stylized illustration of a nuclear power reactor having a gravity-driven cooling system with isolation condenser heat exchange surfaces included therein according to the prior art.

FIG. 4 is a mechanical diagram of an integrated cooling apparatus according to one embodiment of the invention.

DETAILED DESCRIPTION OF THE DRAWINGS

The invention will now be explained by reference to the prior art cooling systems and then by reference to various embodiments and advantages of the invention.

Referring to FIG. 1, FIG. 1 shows a nuclear power generating system 2 having a nuclear boiling water reactor 10 according to the prior art. The nuclear boiling water reactor 10 includes a reactor core 20 which heats water to generate a two-phase steam/water mixture. A core shroud head 22 overlies the reactor core 20 and receives the two-phase steam/water mixture. A plurality of standpipes 18 convey the steam/water mixture to a steam separator assembly 16. The steam separator assembly 16 classifies the steam from water. The separated steam is piped from an outlet 26 over pipeline 5 through a valve 6 to a turbine generator 7. The spent steam from turbine generator 7 is provided to a condenser 8. Condensate from condenser 8 is returned to the reactor 10 at an inlet 15 by a feedwater injection system that includes a pump 9.

The water separated by separator assembly 16 flows back into the reactor pressure vessel and forms a part of the reactor coolant inventory 24.

FIG. 1 also shows an isolation cooling system and a shutdown cooling system that include elements that are common to the prior art as shown in this FIG. 1 and to one embodiment of the invention as shown in FIG. 2. These common elements include a piping network for conveying pressurized steam from the reactor during isolation cooling; a condenser for receiving the heated steam during isolation cooling; a piping network for conveying heated reactor cooling water from the reactor during shutdown cooling; a secondary heat exchanger for removing heat from the reactor cooling water during shutdown cooling; a cooling pond for providing an additional means for removing heat from the reactor cooling water during shutdown cooling; and a recirculation system for conveying cooled/condensed steam and cooled reactor coolant back to the nuclear reactor.

The piping network for conveying heated steam from the reactor includes a pipeline 30 which conducts steam from nuclear reactor steam outlet 12 to an isolation valve 31 during an isolation cooling mode. Isolation valve 31 is opened and closed by a motor 32 which is responsive to a remote motor control unit 33. The nuclear reactor vessel 10, the pipeline 30 and the valve, motors and remote control units are typically located inside the reactor containment 4.

Pipeline 30 continues from valve 31 to another isolation valve 34 which is located outside the reactor containment 4. Isolation valve 34 is controlled by a motor 35 which is responsive to a remote motor control unit 36. An output of valve 34 is coupled to a pipeline 50 which conveys steam to a supply side of isolation condenser 100.

Isolation condenser 100 includes a housing or shell 104, a quantity of isolation condenser coolant 102, and a heat exchange surface 54. Isolation condenser 100 is also provided with a vent or duct system 99 which conveys steam to the atmosphere.

Heat exchange surface 54 includes an input side 53 and a discharge side 55. The discharge side 55 is coupled to a return pipeline 68 which conveys cooled, condensed steam to the reactor pressure vessel.

Pipeline 68 is connected to an input of an isolation valve 61. Isolation valve 61 is controlled by a motor 62 which is responsive to a remote motor control unit 69. The output of isolation valve 61 is connected to a recirculation pipeline 81 inside the reactor containment 4.

Recirculation pipeline 81 is connected from an outlet 80 of the reactor pressure vessel to an input side of a recirculation pump 82. Recirculation pump 82 continuously circulates coolant inside the reactor when the reactor is in a cooling mode. An output of recirculation pump 82 is connected by a recirculation line 83 to an inlet 84 to the reactor vessel.

Referring still to FIG. 1 there is shown a separate shutdown cooling system according to the prior art. As shown in FIG. 1, a coolant outlet 14 for the reactor 10 conveys coolant from the reactor 10 to a reactor coolant isolation valve 41. Isolation valve 41 has an output coupled to reactor coolant circulation pump 42 by a pipeline 40. Pump 42 circulates reactor coolant from the reactor 10 to a shutdown cooling system when the reactor is in a shutdown cooling mode.

Coolant pump 42 is connected by pipeline 43 to inlet 210 of shutdown cooling exchanger 200. The reactor coolant is circulated through the tube side of a heat exchange surface 204. Heat exchange surface 204 is immersed in an intermediate coolant 202. The reactor coolant is removed from exchanger 200 at outlet 212. The cooled reactor coolant is circulated from outlet 212 by pipeline 213 to return pipeline 68. The returned cooled reactor coolant is thereafter circulated back into the reactor in the same manner as the cooled condensed steam.

Referring still to FIG. 1, a secondary heat exchanger 120 is used in certain nuclear power station applications as a buffer between the shutdown cooling heat exchanger 200 and a cooling pond 130. For these configurations, the intermediate coolant 202 in the shutdown cooling heat exchanger 200 is conveyed from a discharge outlet 206 by pipeline 218 to a valve 220. Valve 220 is controlled by motor 222 which is responsive to remote motor control unit 224. The output of valve 220 is connected by pipes to secondary heat exchanger 120.

Secondary heat exchanger 120 includes a heat exchange surface 122. The intermediate coolant 202 from shutdown cooling heat exchanger 200 is circulated to the shell side of heat exchange surface 122 and is removed from secondary heat exchanger 120 at an outlet 125. Baffles 124 mix coolant 202. Outlet 125 is connected to a circulation pump 140. The output of circulation pump 140 is coupled to an isolation valve 141. Isolation valve 141 is controlled by a motor 142 which is responsive to a remote motor control unit 143. The cooled intermediate coolant is conveyed from the output side of valve 141 to inlet 208 of shutdown cooling heat exchanger 200 where it is used again to cool the reactor coolant injected at inlet 210.

Coolant 202 is commonly maintained at an operating pressure higher than the pressure of the reactor coolant in reactor 10 during the operating mode. The coolant 202 is maintained at this higher pressure in order to prevent any outward transport of radioactivity that might otherwise occur if tube leaks in heat transfer surface 204 were to develop. Since intermediate coolant 202 is commonly operated at such a higher pressure, all equipment associated with intermediate coolant 202 must be designed to withstand such higher pressure conditions.

Secondary heat exchanger 120 includes a quantity of raw water coolant 132 from cooling pond 130. Coolant 132 flows through the tube side of heat exchange surface 122. The raw water coolant 132 in cooling pond 130 is circulated by a circulation pump 134 through pipeline 136 to an inlet 126 to heat exchange surface 122. An outlet 127 provides return, heated raw water coolant to a pipeline 131 which conveys the heated raw water coolant back to cooling pond 130.

Refer now to FIG. 3. FIG. 3 is a partial illustration of a nuclear power generating system having a boiling water reactor 10 and a gravity-driven cooling system 150. Such a system is representative of advanced nuclear boiling water reactor designs having the isolation cooling system integrated into the containment pressure suppression pool 156. As shown in FIG. 3, the gravity-driven cooling system 150 includes a suppression pool 156 which contains a quantity of emergency water coolant 158.

This isolation cooling system design includes a steam supply line 153, heat exchange surfaces 155 and condensate discharge line 157. Steam supply line 153 is connected to the tube side of a plurality of heat exchange surfaces 155. Steam supply line 153 conveys steam from reactor pressure vessel 10 to the inlet to heat exchange surfaces 155. Heat exchange surfaces 155 have a discharge side connected to pipeline 157. Pipeline 157 is connected back to reactor 10 to provide cooled condensed steam for replenishing reactor coolant and thus for cooling reactor core 20.

As previously explained, the prior art systems as depicted in FIGS. 1 and 3 suffer from several drawbacks. The system of FIG. 1 requires a number of shells for the various shutdown heat exchangers. These shells must meet costly high pressure design requirements. The heat exchange surfaces operate with a low heat transfer temperature differential. Thus, the shells and surfaces are large and expensive.

The shells are generally included within the reactor building and therefore occupy a large amount of space. Even more space must be provided to permit maintenance of the heat exchange surfaces included in the heat exchangers and the isolation condenser.

The gravity-driven cooling system design requires an increase in the size of the reactor containment which adds significantly to the overall nuclear power generating system costs.

Refer now to FIG. 2 which is a detailed diagram of a nuclear power generating system 2 having improved isolation cooling and shutdown cooling systems according to one embodiment of the invention. This system includes the isolation condenser 100, the secondary heat exchanger 120, a cooling pond 130, and circulation pipe, pumps and valves in common with the prior art system of FIG. 1. However, the system according to the invention dispenses with the separate shutdown cooling heat exchanger 200, permitting significant cost, maintenance and space savings.

The arrangement of the improved cooling system will now be explained first by reference to FIG. 2 and then by reference to FIG. 4. It should be understood, however, that other arrangements or embodiments are possible without departing from the scope or spirit of the invention.

As shown in FIG. 2, the isolation condenser 100 now includes a plurality of heat exchange surfaces 54, 64 and 74. These heat exchange surfaces are immersed in isolation condenser water coolant 102 and are sized for shutdown cooling duty. As used herein, "isolation condenser water coolant" means the initial water inventory in isolation condenser 100 as well as makeup water added to offset boiling and venting.

Steam supply line 50 is coupled to an input 53 of heat exchange surface 54. Cooled condensed reactor steam is coupled from an outlet 55 of heat exchange surface 54 over pipeline 56 to return line 68.

The reactor coolant pipeline 43 from the nuclear reactor 10 now branches into three reactor coolant input pipelines 44, 45, and 46 which are in turn coupled to inputs to the heat exchange surfaces 54, 64, and 74 included in isolation condenser 100.

Pipelines 44, 45 to 46 each carry about $\frac{1}{3}$ the capacity of line 43 and thus may be of smaller size than line 43. Pipeline 46 branches from pipeline 43 to the input side of an isolation valve 47. The output of isolation valve 47 is coupled to pipeline 50 which, as previously mentioned, couples heated steam from the nuclear reactor 10. Thus, heated reactor coolant conveyed over pipeline 46 is coupled to input 53 of heat exchange surface 54.

Pipeline 45 is connected to input 63 of heat exchange surface 64. The output 65 of heat exchange surface 64 is coupled by pipeline 66 to return pipeline 68.

Likewise, pipeline 44 is connected to input 73 of heat exchange surface 74. The output 75 of heat exchange surface 74 is connected by pipeline 76 to return line 68.

Isolation condenser 100 (i.e., the cooling apparatus) also has a shell or housing 104 which contains isolation condenser coolant 102. Housing 104 may be a conventional "shell and tube, multiple water box" heat exchanger. Heat exchange surfaces 54, 64 and 74 are immersed in isolation condenser coolant 102. Cooling apparatus 100 also has a vent or duct system 99 which conveys isolation coolant 102 that has been heated into steam to the atmosphere. Isolation condenser coolant 102 has a free surface 103 to enhance steam boiloff when isolation condenser 102 is rapidly heated during the isolation cooling mode and during the early phases of the shutdown cooling mode. Cooling apparatus 100 may also include a draining system 90. Drain system 90 may be a conventional drain system and include a pipeline and associated drain valves.

Condensed steam and reactor coolant are connected by pipeline 68 back to the recirculation line 81 according to the prior art.

The isolation condenser 102 in apparatus 100 is used to remove heat from the hot steam and reactor coolant. The isolation condenser coolant 102 and cooling apparatus 100 may be demineralized water, for example, reactor cooling water or water from the station makeup water system that has been purified.

The isolation condenser coolant 102 in cooling apparatus 100 is itself cooled by circulation through a secondary heat exchanger 120. The isolation condenser 102 is conveyed from an outlet 112 on housing 104 through a pipeline 121 to an input 123 of secondary heat exchanger 120. Since coolant 102 is clean, it may be provided on the shell side of heat exchange surface 122 in secondary heat exchanger 120. Heat exchange surface 122 is thus disposed in isolation condenser coolant 102. The warm isolation condenser coolant is cooled as it flows in intimate contact with heat exchange surface 122 as directed by internal baffle plates 124. The cooled isolation condenser coolant 102 is returned to an inlet 110 of cooling apparatus 104 using pumps 140 and associated pipelines and valves as previously discussed for the prior art.

Secondary heat exchanger 120 uses a quantity of raw water coolant 132 obtained from cooling pond 130 for cooling the isolation condenser coolant 102. This raw water coolant is circulated as previously discussed for the prior art.

As shown in FIG. 2, the nuclear reactor 10, the recirculation loop 140, and the gravity driven cooling system 150 and associated pipes and isolation valves are generally contained within the reactor containment 4. The remainder of the cooling system is contained within the reactor building 3 with the exception of the cooling pond and associated pipes and pumps.

Although the embodiment shown in FIG. 2 includes only one cooling apparatus, in normal practice a plurality of such cooling apparatus may be used within the scope or spirit of the invention. In like fashion, a greater plurality of heat exchange surfaces may also be used inside the cooling apparatus 100 within the scope and spirit of the invention.

Refer now to FIG. 4 which shows a mechanical diagram of a cooling apparatus according to one embodiment of the invention. As shown in FIG. 4, cooling apparatus 100 includes a shell 104 having ends 105 and 107, and including isolation condenser coolant 102 up to a free water level 103.

A plurality of vents 99, 99A and 99B permit steam which is generated from boiling isolation condenser coolant 102 to be conveyed to the atmosphere. A steam dryer assembly 98 conveys moisture classified by the dryer from the vapor/moisture mixture rising from free surface 103 back into housing 104.

The cooling apparatus 100 in FIG. 4 also includes a plurality of heat exchange surface assemblies 54, 64, 74 and 54A, 64A, and 74A. Each heat exchange surface assembly includes an integral tube sheet-and-water box member together with a tube bundle comprised of a plurality of U tubes. The tube sheets, water boxes, and U tubes may be fabricated and configured as for conventional isolation condensers and will include additional parts not shown according to the technology, design and manufacturing practices of conventional equipment suppliers.

It should be understood that the embodiment in FIG. 4 employs six total tube sheet assemblies. Assemblies 54, 64 (not shown) and 74 are disposed at end 107 of cooling apparatus 100 in an inverted triangular pitch configuration with assembly 54 being the lowermost positioned assembly at end 107. Assemblies 54A, 64A and 74A (not shown) are disposed at opposing end 105 of housing 104 in an opposing triangular configuration to heat exchange surface assemblies 54, 64 and 74 respectively.

Isolation condenser coolant 102 is provided to shell 104 by an input pipe 110. Input pipe 110 connects to end 107 of apparatus 100, somewhat above the horizontal center line of shell 104. Input line 110 conveys coolant from the secondary heat exchange system (not shown) to the cooling apparatus 100. A return pipeline 112 is coupled to the bottom 108 of apparatus 100. Return line 112 returns heated isolation condenser coolant 102 to a secondary heat exchange system (not shown) for heat removal.

For a conventional reactor, the heat exchange surface area required for shutdown cooling is about three times the heat exchange surface area required for isolation condensing cooling. Thus, for the embodiment shown in FIG. 4, heat exchange surfaces 54 and 54A may be used for isolation cooling whereas all six transfer surfaces may be used for shutdown cooling duty. The shell of a conventional isolation condenser defines a volume large enough to house the shutdown cooling heat exchange surfaces.

The positioning of the isolation condenser cooling heat exchange assemblies toward the bottom of the isolation condenser shell provides the longest operation period for isolation cooling heat exchange. Following a reactor isolation condition, isolation coolant inventory draw-down is caused by steam generation and venting of isolation coolant to atmosphere. This isolation coolant draw-down could gradually uncover upper tubes in the U-tube assembly and require replenishment of isolation coolant. Thus, the isolation condenser heat exchange assemblies may be positioned toward the bottom of the isolation condenser shell to provide the longest operation period possible before it is necessary to replenish isolation condenser coolant.

Valves may also be included in the system to permit the steam to be provided exclusively to the lowermost heat exchange surfaces during isolation cooling. In this connection, it should be observed that isolation cooling occurs at very high pressures and temperatures, potentially up to reactor design pressures of 1250 psig and over 500° F. As a result, the heat exchange assemblies for isolation cooling, i.e., tube assemblies, must be of a material and wall thickness capable of withstanding these operating conditions. On the other hand, the shutdown cooling mode occurs under moderately high pressures and temperatures, for example, 175 psig and below 212° F. Thus, the heat exchange assemblies that are used exclusively for shutdown cooling may be fabricated from materials having lower pressure ratings and temperatures than those used for isolation cooling.

Valves could also be used, (i.e.. pressure relief valves) to prevent exposure of the lower rated shutdown cooling heat surfaces to the isolation cooling operating conditions.

It is to be appreciated that the invention capitalizes on the fact that the reactor does not require simultaneous shutdown cooling and isolation cooling. It is possible, however, for the shutdown cooling mode to follow an isolation cooling mode if the plant were shutdown because of the load rejection event. The conventional reactor does not normally initiate shutdown cooling until the reactor has been significantly depressurized and cooled down by the isolation condenser (or by some other pressure unloading system). This depressurization and cool down normally requires up to two or three hours. Thus, there is ample time for smoothly switching the reactor decay removal function from the isolation cooling mode to the shutdown cooling mode.

Although the invention has been explained with reference to the foregoing embodiments, it should be understood that other changes and modifications may be made to the foregoing embodiments without departing from the scope or spirit of the invention. Alternative configurations may be used, such as a greater or smaller number of heat exchange surface assemblies, without departing from the scope of the invention. A plurality of cooling apparatus could be used depending on design requirements and overall cost considerations. The isolation condenser coolant and the cooling apparatus could be raw water coolant and could be piped to the shell side of the heat exchange surfaces under emergency conditions to give greater long term capacity for decay heat removal when auxiliary power supplies are limited. Secondary coolant could be piped to the shell side of the cooling apparatus or the secondary heat exchanger rather than to the tube side as previously discussed. The placement of isolation condenser coolant inlets, discharges, steam vent lines, drain lines, and so forth could also be optimized to meet specific applications.

The isolation condenser coolant may also be circulated through the secondary heat exchange coolant during the isolation cooling mode to provide increased cooling of the hot reactor steam before the condensate is returned to the reactor as makeup coolant. This approach would augment the effectiveness of other emergency core cooling systems employed during shutdown.

It should thus be understood that the invention is limited only by the appended claims.

What is claimed is:

1. In a decay heat removal system for a nuclear boiling water reactor, a cooling apparatus comprising:
    an isolation condenser shell; and
    a heat exchange loop transpiercing said shell and sized for shutdown cooling duty,
    said cooling apparatus connected to said nuclear boiling water reactor and to additional heat exchange loops to provide both isolation cooling and shutdown cooling for said nuclear boiling water reactor.

2. In a boiling water nuclear power generating system including:
    a nuclear boiling water reactor having a controlled reactor core for heating feedwater to generate steam;
    a turbine-generator for receiving steam and generating electric power;
    a condenser feedwater system for receiving spent steam, producing condensate, and injecting feedwater back into said reactor;
    an isolation cooling system for condensing steam from said reactor independent of said turbine-generator and for dissipating the energy of said steam during controlled shutdown of said reactor; and
    a shutdown cooling system for maintaining the water in said boiling water reactor at a temperature permitting refueling of said reactor;
    a combined isolation and shutdown cooling system comprising in combination:
    an isolation condenser shell, said shell containing nonradioactive coolant;
    a heat exchange loop transpiercing said shell, said loop including means for admitting steam shunted from said reactor independent of said turbine-generator to exchange heat by condensing said reactor steam while boiling said nonradioactive coolant in said condenser shell;
    a steam vent in said condenser shell for venting boiling nonradioactive coolant to atmosphere; and
    means for connecting said shutdown cooling system to said heat exchange loop during shutdown of said reactor.

3. A process for cooling a nuclear boiling water reactor, said reactor having a reactor core for heating reactor coolant to generate steam, a turbine-generator for receiving said steam and generating electric power, and a feedwater system for receiving spent steam and providing feedwater back into said reactor, said process comprising:
    providing a condenser cooling shell;
    filling said condenser cooling shell with nonradioactive coolant;
    providing a heat exchange loop transpiercing said shell for effecting heat exchange with said nonradioactive coolant;
    connecting said loop in a shunt independent of said turbine-generator during emergency shutdown of said reactor to dissipate heat from said steam and said reactor coolant; and
    venting said nonradioactive coolant to atmosphere when said nonradioactive coolant is heated to boiling.

4. In a nuclear power generating system of the type including:
    a nuclear boiling water reactor having a reactor core for heating feedwater to generate a two-phase steam/water mixture and a steam separator for classifying said steam from said water;
    a turbine-generator for receiving said steam to generate electric power;
    a power grid for receiving electric power from said turbine-generator; and means for isolating said reactor from said turbine-generator during shutdown of said reactor core;

an improved cooling system for dissipating heat generated by said shutdown reactor core comprising;

a cooling apparatus, said apparatus including a housing containing water coolant and a plurality of heat exchange surfaces immersed in said water coolant;

means for circulating steam from said reactor through said surfaces to remove heat from said steam when said reactor core is shutdown;

means for circulating condensed steam from said surfaces back into said reactor when said reactor core is shutdown;

means for circulating said reactor coolant from said reactor through said surfaces to remove heat from said reactor coolant when said reactor core is shutdown;

means for circulating cooled reactor coolant from said surfaces back into said reactor when said reactor core is shutdown;

means for venting said nonradioactive water coolant from said housing into the atmosphere when said nonradioactive water coolant is boiled to steam; and means for circulating said nonradioactive water coolant from said apparatus through a secondary heat exchange loop to dissipate sufficient heat from said reactor coolant so that said reactor can be refueled.

5. The power generating system of claim 4 and wherein said nonradioactive water coolant is circulated through said secondary heat exchange loop to dissipate additional heat from said steam.

* * * * *